US006831881B2

United States Patent
Patil et al.

(10) Patent No.: US 6,831,881 B2
(45) Date of Patent: Dec. 14, 2004

(54) EQUALIZER-EFFECT MEDIA SYSTEM AND METHOD

(75) Inventors: Sandeep M. Patil, Kolhapur (IN); Nitin A. Ghate, Akola (IN)

(73) Assignee: PortalPlayer, Inc., Santa Clara, CA (US)

(*) Notice: Subject to any disclaimer, the term of this patent is extended or adjusted under 35 U.S.C. 154(b) by 296 days.

(21) Appl. No.: 10/119,568

(22) Filed: Apr. 9, 2002

(65) Prior Publication Data

US 2003/0189881 A1 Oct. 9, 2003

(51) Int. Cl.[7] ............................................. G11B 21/08
(52) U.S. Cl. .................... 369/30.18; 369/53.1; 369/280
(58) Field of Search .......................... 369/30.18, 47.21, 369/53.22, 53.31, 53.1, 47.33, 47.38, 53.23, 44.25, 44.27, 275.1, 275.2, 280, 275.4; 386/126, 125, 104, 96, 11, 116; 704/503, 211, 270

(56) References Cited

U.S. PATENT DOCUMENTS

| | | | | |
|---|---|---|---|---|
| 5,282,186 A | * | 1/1994 | Yoshio et al. | 369/47.21 |
| 5,592,450 A | * | 1/1997 | Yonemitsu et al. | 386/96 |
| 6,061,318 A | * | 5/2000 | Hwang | 369/53.23 |
| 6,343,182 B1 | * | 1/2002 | Kim et al. | 386/126 |
| 6,747,933 B2 | * | 6/2004 | Ueki | 369/53.31 |

* cited by examiner

*Primary Examiner*—Ali Neyzari
(74) *Attorney, Agent, or Firm*—David Jaffer; Pillsbury Winthrop LLP

(57) ABSTRACT

A piece of media, apparatus and method are provided wherein the piece of media may store the audio data as well as equalizer settings that permit the audio data to be equalized. In one embodiment, the piece of media stores equalized audio data and the equalizer settings. In accordance with the invention, in one embodiment, the equalizer-effect piece of media permits the audio data on the piece of media to be equalized even when the audio data player does not include an equalizer. In another embodiment, the equalizer-effect piece of media includes raw audio data and equalizer settings and permits an external equalizer to play equalized audio data without needing to set the equalizer. In a preferred embodiment, the piece of media may be compact disk.

41 Claims, 6 Drawing Sheets

EQUALIZER-EFFECT MEDIA SYSTEM AND METHOD

BACKGROUND OF THE INVENTION

This invention relates generally to a system and method for providing audio data that has been equalized and in particular to a system and method for providing equalized audio data from a piece of media.

It is well known that it is desirable to be able to equalize audio data prior to listening to the audio data. Every stereo system, including some portable systems as well as professional stereo systems typically has an equalizer to equalize the audio data. An equalizer typically will adjust the energy levels of the audio data in one or more different frequency bands in order to change the characteristics of the audio data. For example, the equalizer may adjust the audio data to concentrate more of the audio data into the middle frequency range which is more perceptible to more people. An equalizer may also be used to add more audio energy to the lower frequency bands which will then provide more bass sounds. Thus, an equalizer may be used to adjust the relative sound energy of the audio data at one or more different frequencies as is well known. A typical equalizer may have 20 different frequency bands. The level of adjustment for each frequency band is controlled by a equalizer setting so that, for the 20 band equalizer, there may be 20 equalizer settings.

Typically, an audio system may receive typical audio data. A hardware equalizer within the audio system may then adjust the sound energy of the audio data as described above. The equalizer may generate equalized audio data that may then be converted into analog data so that sound may be generated by a sound generating device, such as a speaker or headphone. Thus, in a typical system, it is necessary to have an equalizer unit, whether built into an audio system or a separate stand-alone unit, in order to adjust the audio data. The problem is that some new technology does not have an equalizer due to size or other constraints. Therefore, for these newer technologies, such as a digital audio data player, it would be desirable to provide some mechanism to provide equalized audio data, whether analog or digital, to these newer devices that do not typically have equalizer capabilities. Thus, it is desirable to provide an equalizer system and method that provides equalized audio data and it is to this end that the present invention is directed.

SUMMARY OF THE INVENTION

The invention overcomes the above problems and limitations with typical systems. For example, the invention permits a hardware device, such as a portable MP3 player, that does not have an equalizer to generate and play equalized audio data. The invention also permits the equalization levels for a particular track/song or piece of media to be preset so that an external equalizer may generate consistent equalized audio data using the invention. In accordance with the invention, the invention may be implemented on a piece of media that stores digital data, such as a compact disk or the like. In a preferred embodiment, the piece of media is a CD and the digital data is audio data, such as tracks/songs, that is equalized using the equalizer settings that are stored on the piece of media. The audio CD in the preferred embodiment may be in the CD-DA format (Red Book format). In different embodiments, the equalizer settings may be stored in the lead in area of the piece of media, in the program area of the piece of media or as data at the end of the tracks of the piece of media.

Thus, in accordance with the invention, a piece of media having equalizer effects is provided wherein the media has one or more pieces of data stored thereon. The data further comprises a plurality of digital samples of audio data, and one or more equalizer settings so that the audio samples are equalized when the audio data is played. In accordance with another aspect of the invention, a method for generating a piece of media having equalizer effects is provided. The method comprises storing a plurality of digital samples of audio data onto a piece of media, and storing one or more equalizer settings onto the piece of media so that the audio data is equalized when it is played.

DESCRIPTION OF A PREFERRED EMBODIMENT AND OTHER EMBODIMENTS

The invention is particularly applicable to producing an audio CD (in the CD-DA format) having equalizer effects on the CD and it is in this context that the invention will be described. It will be appreciated, however, that the equalizer system and method on media in accordance with the invention has greater utility since it can be used to burn data onto a variety of different media (including any new media that is capable of holding digital data) and the method may be used for a variety of different data.

Figure 1:
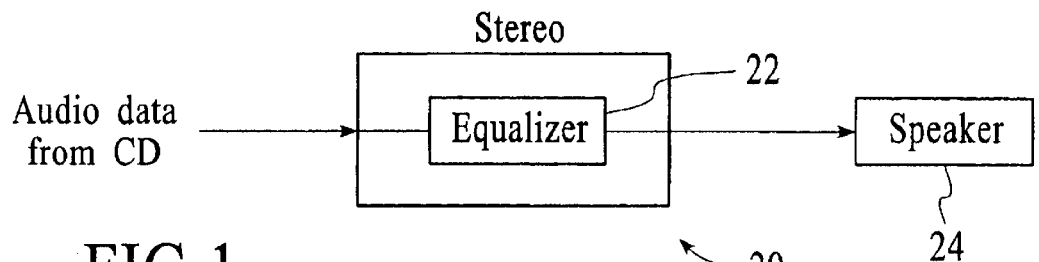
FIG. 1 is a block diagram illustrating a typical audio system.

FIG. 1 is a block diagram illustrating a typical audio system 20 that may be used to play a piece of media, such as a compact disk (CD). The audio system may include a hardware equalizer 22 that equalizes the sound energy in each different frequency band as is well known so that the resultant signals that are output to a speaker 24 are equalized and the sound generated by the speaker sounds better to the listener. As described above, the equalizer is able to independently adjust (either automatically or based on a user's settings) any of one or more different frequency bands in the audio data. As can be seen by FIG. 1, in a typical system, some form of an equalizer is necessary to equalize the audio data in order to be able to listen to equalized signals. In accordance with the invention, there is often no equalizer available for some audio devices, such as portable digital audio players and the like. Therefore, people with these new devices that do not have equalizers are unable to change the frequency characteristics of the digital audio being heard. The invention in accordance with the invention overcomes this limitations and permits a user of these devices to be able to listen to equalized audio data as will now be described.

Figure 2:
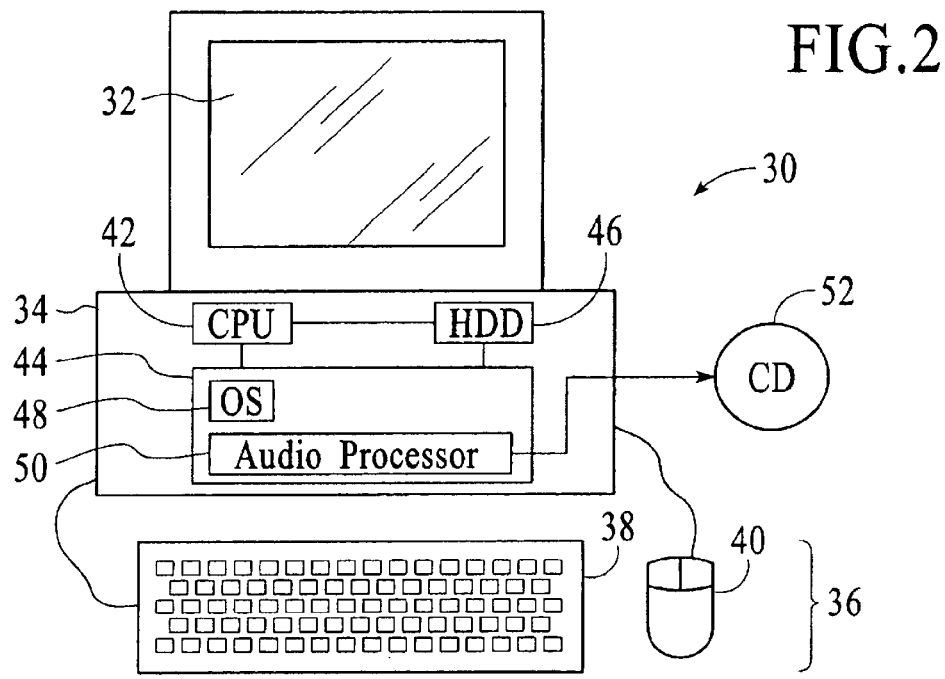
FIG. 2 is a block diagram illustrating an example of a computer system that is capable of generating the equalizer on media in accordance with the invention.

FIG. 2 is a block diagram illustrating an example of a computer system 30, such as a personal computer system, that is capable of generating the equalizer on media in accordance with the invention. The computer system may include a display device 32, such as a LCD or CRT, a chassis 34 that houses the main portion of the computer system and one or more input/output devices 36, such as a keyboard 38 and a mouse 40 that permit the user of the computer system to interact with the computer system. For example, the input/output devices may permit the user to enter data/instructions into the computer system and may permit the user to display result data to the user such as by displaying data on the display device or printing data on an attached printer (not shown). In more detail, the chassis 34 may house a central processing unit (CPU) 42 that controls the operation of the computer system, a temporary memory 44, such as DRAM or SRAM, that stores the data and instructions currently being executed by the CPU, such as the operating system (OS) 48 and an audio processor 50 shown, and a persistent storage device 46, such as hard disk drive, optical drive, tape drive or the like that permanently stores the data and instructions.

Figure 3:
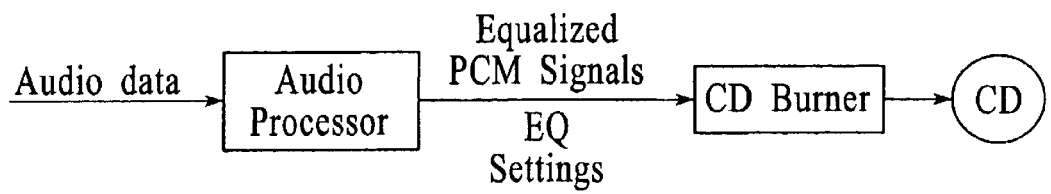
FIG. 3 is a flowchart illustrating a method for generating an equalizer on CD in accordance with the invention.

The audio processor 50 may be executed by the CPU 42 (as shown since it is loaded into the memory 44) in order to process incoming audio data signals in order to generate the equalized signals that may be loaded onto a piece of media 52, such as a CD as shown. Thus, the invention generates, in the preferred embodiment shown, an equalizer-effect CD wherein the CD contains the equalized audio data so that a device, such as a portable digital audio player that does not have an equalizer, is capable of playing equalized audio data. FIG. 3 illustrates the equalizer-effect CD generating process in which the incoming audio data is processed to generate equalized output audio data (typically pulse code modulated [PCM] signals) and equalizer settings that may be burned onto a CD using a CD burner. The equalizer-effect CD may be generated using two different embodiments that will be described below with reference to FIGS. 4 and 5. In particular, the equalizer-effect CD may be generated by 1) burning the CD with the equalized PCM (pulse code modulated) samples (which have been previously processed by any equalizer module) and equalizer settings; or 2) burning the CD with raw PCM samples and store the equalizer settings so that an external equalizer may generate consistent equalized signals based on the stored equalizer settings.

It is noted that the raw audio data (the PCM samples) and the equalized PCM samples have the same format and both can be played using a typical CD player. The difference between the raw PCM samples and the equalized PCM samples is that the strength of the samples for one or more frequency bands may differ between the raw PCM samples and the equalized PCM samples. Thus, the equalized PCM samples may sound better to a user when played than the raw PCM samples. Once the CD has been burned, it may be played by a typical digital hardware data device, such as a portable MP3 player, a CD player or the like, wherein the audio data is equalized as it is read from the CD even though the hardware device does not have an equalizer. Now, the first embodiment will be described in more detail.

Figure 4:
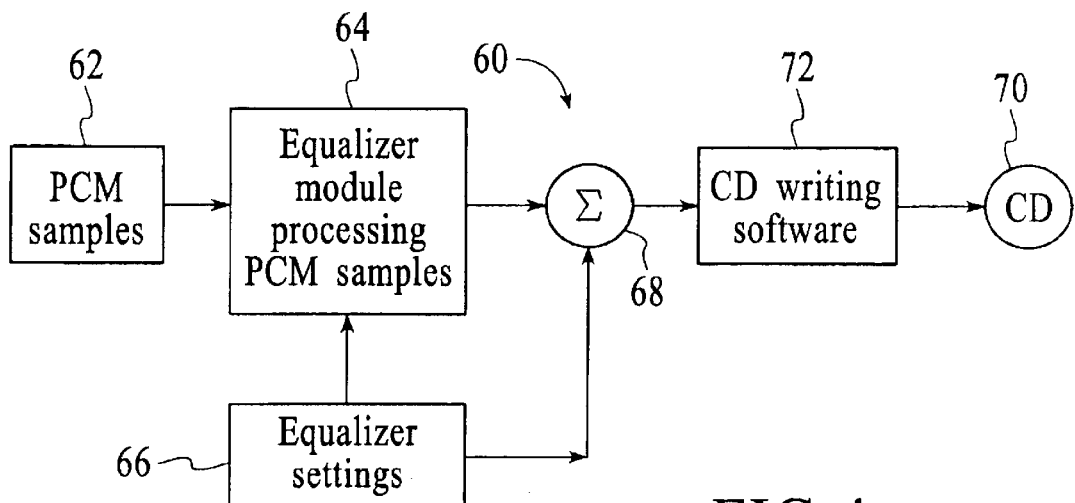
FIG. 4 illustrates a first embodiment of the equalizer on media in accordance with the invention.

FIG. 4 illustrates a first embodiment 60 of the equalizer-effect media in accordance with the invention. In this embodiment, the original audio data 62, such as PCM samples, are fed into a well known software-based equalizer processing module 64 that processes the PCM samples to generate equalized signals based on equalizer settings 66. Then, the equalized PCM signals and the equalizer settings are combined together in step 68 and burned onto a piece of media, such as a CD 70, using well known CD writing software 72. In this manner, the CD contains all of the necessary data in order to listen to equalized audio data.

As described above, the equalized audio data samples on the piece of media may be generated using an equalizer. Furthermore, the equalizer settings on the piece of media may be used by any equalizer. In a preferred embodiment, the equalizer may be 20 band equalizer that has 10 left band channels and 10 right band channels although any equalizer may be used.

Figure 6A:
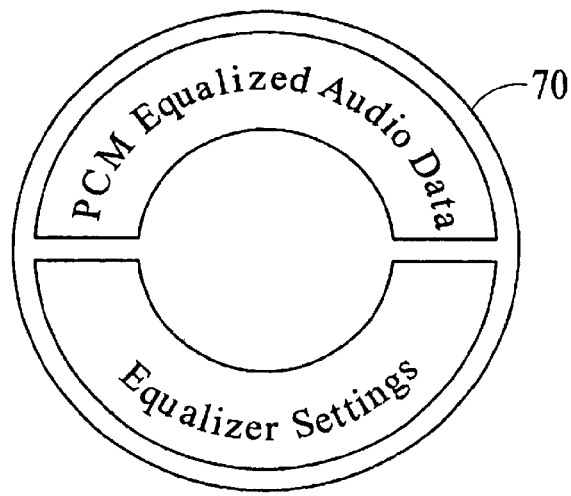
FIG. 6A illustrates an example of a piece of media, such as a CD, that is produced using the embodiment shown in FIG. 4.

Typically audio CDs are made by burning the wave files (.wav PCM samples) onto the CD. The equalizer-effect CD in accordance with the invention can be made by processing the PCM samples with the equalizer module and then burning these PCM samples on the CD. This equalizer-effect CD, when played in the normal CD player or portable digital audio player for example, will produce audible audio data that is equalized (having a equalizer effect with which it was burnt) since the data written on it was processed before writing. The CD in accordance with the invention may also store the equalizer settings on it. These equalizer settings may be used, for example to show the equalizer with which the song was burnt or to nullify the equalizer-effects using "Equalizer nullifying module" so that the CD can be played as a normal CD. An example of the CD with the equalizer audio data and the equalizer settings in accordance with the invention is shown in FIG. 6A.

Figure 6B:
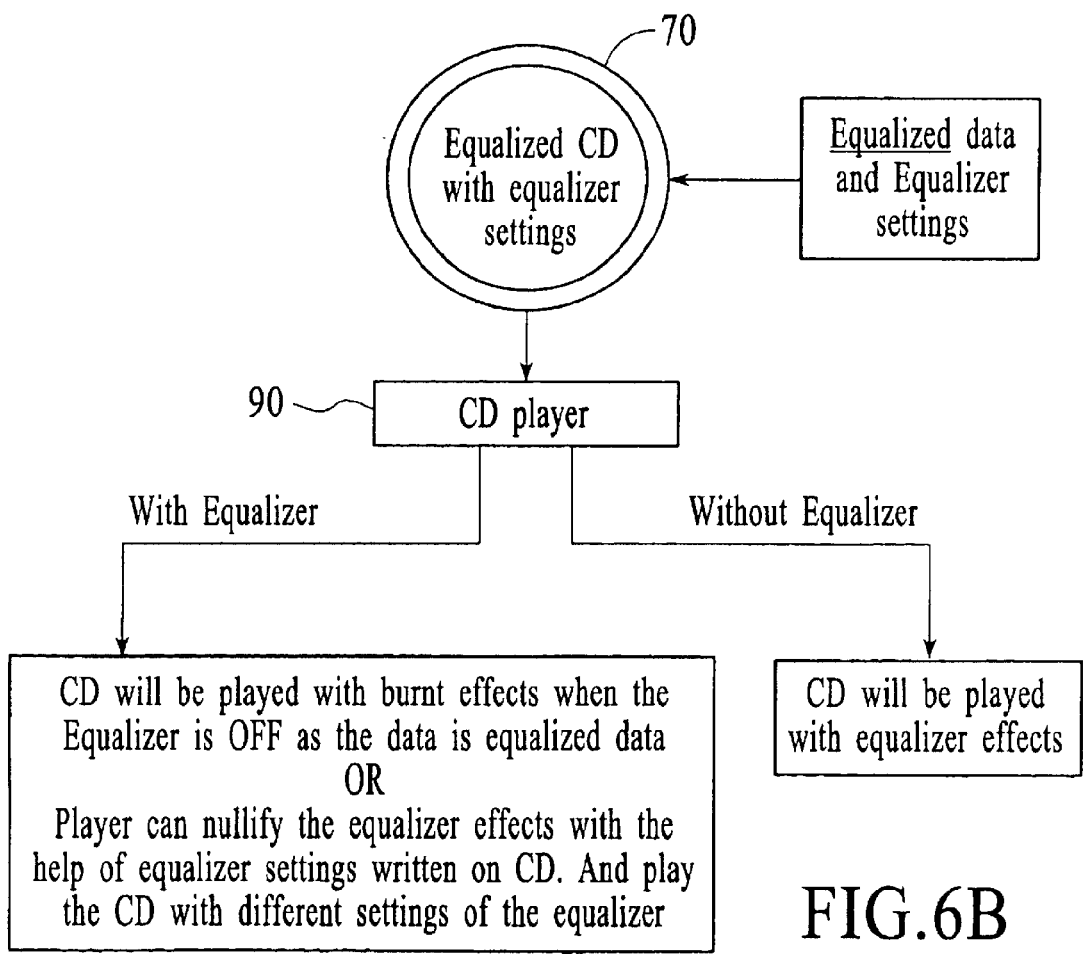
FIG. 6B illustrates the use of the piece of media that is produced using the embodiment shown in FIG. 4.

FIG. 6B illustrates how the piece of media 70 with the equalized audio data samples and the equalizer settings may be used. In particular, the piece of media may be inserted into a CD player 90. If the CD player 90 does not have an equalizer, then the audio data on the piece of media is played with the equalizer effects that are already contained on the CD (e.g., the equalized audio data samples on the CD are played). If the CD player has its own equalizer, then there are two different ways in which the audio data may be played. In particular, the audio data is played with the equalizer effects already stored on the CD if the equalizer is OFF or, if the equalizer is ON, the CD player may nullify the equalizer effects using the equalizer settings that are stored on CD and then play the audio data with its own equalizer settings. In summary, this embodiment may provide several advantages. The user can enjoy the equalizer-effect CD with the equalizer effect when his CD player or the disk man doesn't have any equalizer. In addition, since the equalizer-effect CD will adhere to the audio CD format; this CD can be played using any CD playing software or CD player. Now, another embodiment of the invention will be described.

Figure 5:
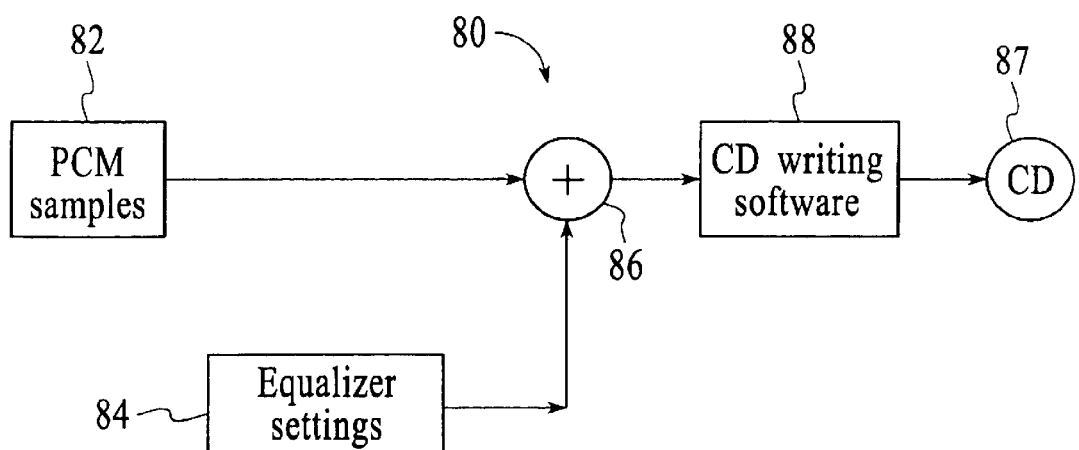
FIG. 5 illustrates a second embodiment of the equalizer on media in accordance with the invention.
Figure 7A:
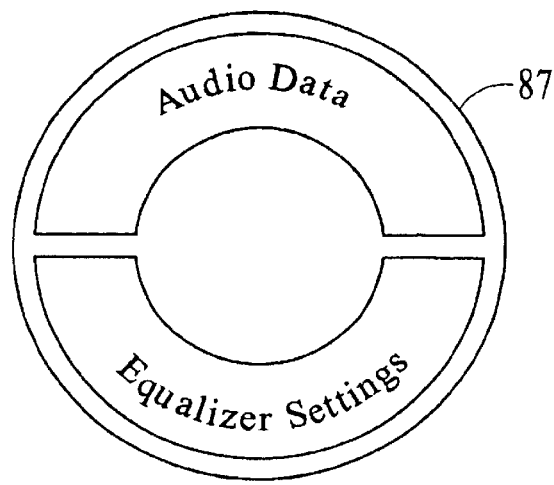
FIG. 7 illustrates an example of a piece of media, such as a CD, that is produced using the embodiment shown in FIG. 5.
FIG. 7B illustrates the use of the piece of media that is produced using the embodiment shown in FIG. 5.

FIG. 5 illustrates a second embodiment 80 of the equalizer-effect media in accordance with the invention. In this embodiment, the incoming PCM audio data 82 (the raw audio data) is combined with one or more equalizer settings 84 in step 86 and then the combined PCM samples and the equalizer settings are burned onto a CD 87 using CD burning software 88 as shown. Using this embodiment, the CD playing software or the CD player, while playing such a CD, will read the equalizer settings and set their equalizers accordingly to generate equalized audio data. In this embodiment, the CD contains the preferred equalizer settings so that an equalizer equipped audio system is able to play the audio data using the preferred equalizer settings. One advantage is that the user will not have to set the equalizer settings every time he listens to the CD. This can be done by the CD playing program automatically since it will read the equalizer settings stored on the CD and automatically set the equalizer. In addition, since the equalizer-effect CD will adhere to the audio CD format this CD will be played by all CD playing software and CD players even if the CD player does not have an equalizer. An example of the CD with the audio data and the equalizer settings in accordance with the invention is shown in FIG. 7A.

Figure 7B:
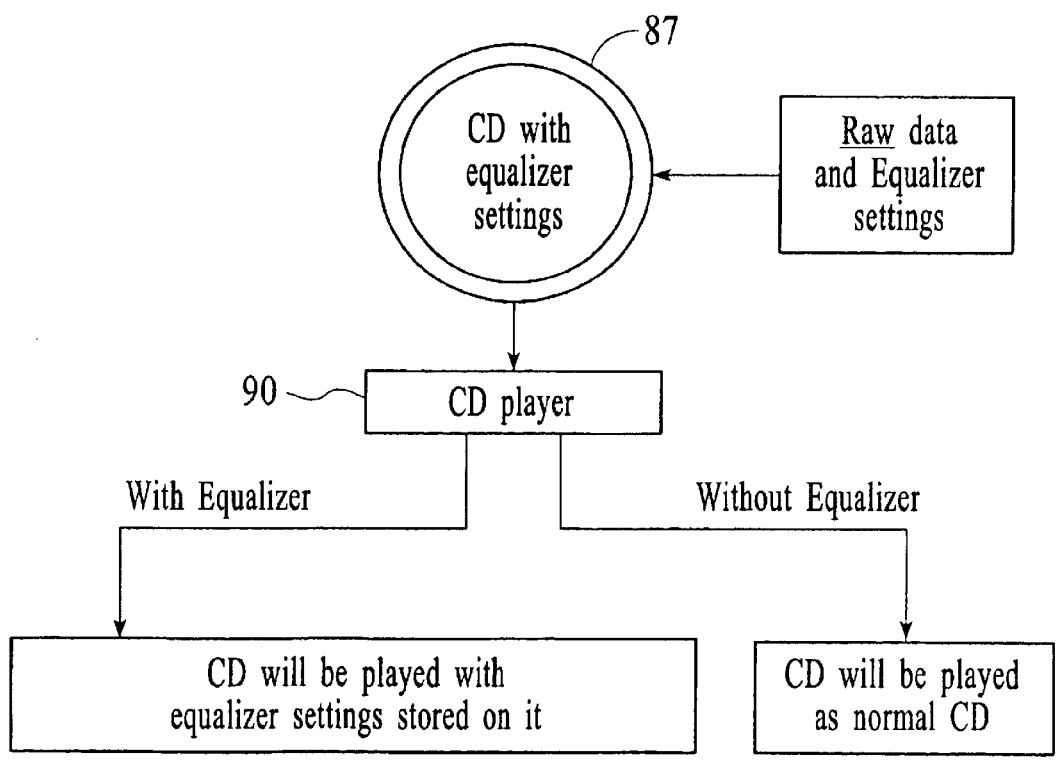

FIG. 7B illustrates how the piece of media 87 with the raw audio data and the equalizer settings may be used. In particular, the piece of media may be inserted into a CD player 90. If the CD player 90 does not have an equalizer, then the audio data on the piece of media is played as a normal CD using the raw audio data contained on the CD. If the CD player has its own equalizer, then the audio data is equalizer using the stored equalizer settings on the piece of media and played.

In both of the above embodiments, the equalizer settings may be at the (a) disk level or (b) track level. In particular, at the disk level, one set of equalizer (EQ) settings will be applied to all the tracks on that disk while, at the track level, the EQ settings for each track will be stored and will be applied to that track during playback or processing. Now, three different methods for storing the equalizer settings in accordance with the invention will be described. First, the typical CD burning process will be described.

Figure 8:
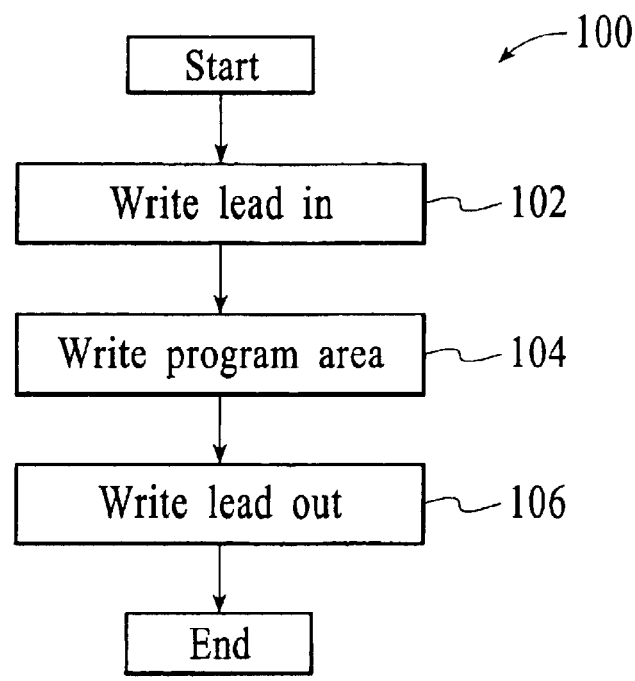
FIG. 8 illustrates a typical method for burning audio media, such as a CD.

FIG. 8 illustrates a typical method 100 for burning audio media, such as a CD. In particular, a CD is divided into sectors and then the sectors are divided into a main channel and sub-channels. The writing of a sector consists of writing the main and sub channels. The main channel contains data whereas the sub channel contains information about the disk internals and the CD content addresses. The sub channels are not completely filled and there is a lot of free and reserved bit that can be made use of. According to the CD-TEXT format, the information pertaining to individual tracks (e.g., song name, album name, genre, etc) is written in the sub-channels in the lead in area. There are P-W sub channels. The P and Q sub-channels contain the disk information and the content details and addresses. The R-W channels are used by the CD text to store the artist, album, track name information To burn a CD, the lead in area is written in step 102, then the program area is written in step 104 and the lead out data is written in step 106. In this manner, the audio CD is generated.

To make the equalizer-effect CD, the EQ settings must be stored on the CD. Thus, the EQ setting have to be burnt onto the CD while the CD is being created. Most widely used equalizers on the market are twenty band equalizers which is fairly typically. The twenty bands are then divided into 10 left channel bands and 10 right channel bands. In view of this, the equalizer-effect CD will need 20 bytes to store the EQ settings of each track. In accordance with the invention, the equalizer setting can be stored in the free space of the lead in area, the free space of the program area or as audio data (20 bytes at the start of the track or the 20 bytes at end of the track). Now, each different technique for storing the equalizer settings on the CD in accordance with the invention will now be described in greater detail.

Figure 9:
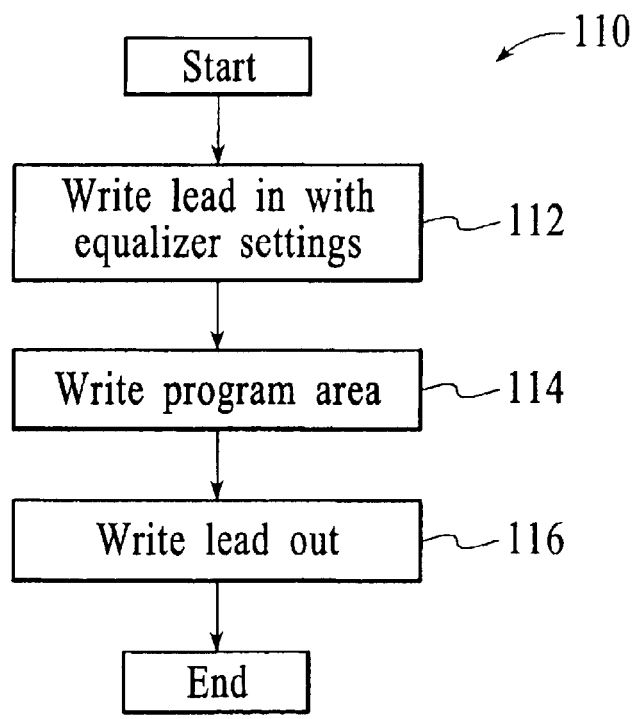
FIG. 9 illustrates a first method for writing the equalizer settings onto the media in accordance with the invention.

FIG. 9 illustrates a first method 110 for writing the equalizer settings onto the media in accordance with the invention wherein the equalizer settings are written into the lead in area in step 112 and the other steps (114, 116) are carried out as before. Within the lead in area, the equalizer settings may be stored in several different locations as will now be described. For example, the equalizer settings may be stored in the free space of the lead in area. There are multiple ways of writing the equalizer data into the lead in area including 1) into the CD-TEXT area, 2) into the main channels or 3) into the free space after the table of contents (TOC).

Extension of CD-TEXT

The CD-TEXT format (a known standard) stores the track related information like track title, album name etc. in R-W sub channels of the lead in area. These fields are identified by predefined indices which range from 80 h to 8 Fh. Some of these indices are 'reserved', and one of these indices can be used to indicate 'equalizer settings' and store the equalizer settings. To accomplish writing into the CD-TEXT, a modification of the driver level is needed since the invention needs to write the P and Q sub-channel data on the CD on our own. With a typical CD, this data is otherwise generated by the CD drive.

Main Channel Storage

The main channel data of the lead in area is null data. Every frame in the lead in area has 2352 free bytes of main channel data. We can store the whole equalizer information in a single frame. This way of writing is not extension to or based on any pre-existing format so the data can be written in its own way and format. To accomplish this, some driver level programming which will read/write the data from/to main channel of lead in is necessary.

Free Space After TOC

The lead in is allocated 10 min independent area on the CD whereas the typical size of lead in is 3 to 4 min. Thus, the area of lead in, after TOC, can be used for writing the equalizer data. To accomplish this, the driver levels must be modified. Now, a technique for storing the equalizer settings in the program area will be described.

Figure 10:
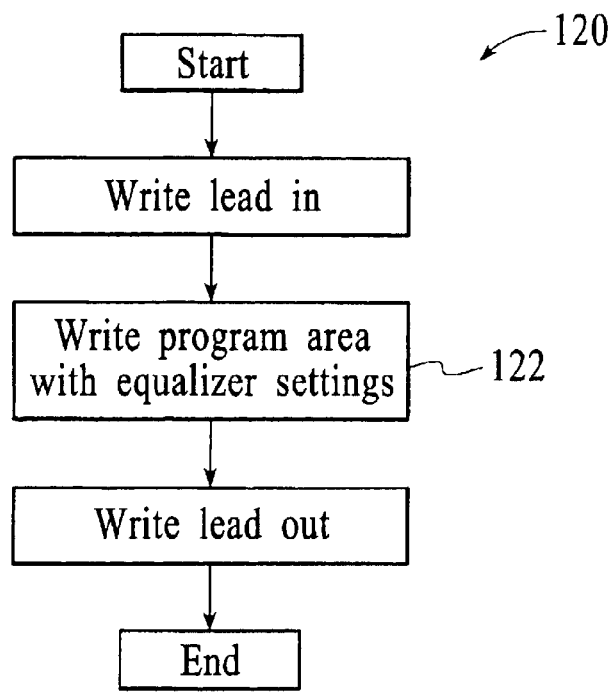
FIG. 10 illustrates a second method for writing the equalizer settings onto the media in accordance with the invention.

FIG. 10 illustrates a second method 120 for writing the equalizer settings onto the media in accordance with the invention wherein, during step 122, the equalizer settings are written into the program area while the other steps of burning the CD are not changed. In particular, the R-W channels in the program area are not utilized. So, the track specific equalizer data may be written in the R-W channels in the first sector of that particular track. The advantage of this approach is that writing R-W channel in program area is already supported by Multi-Media Commands standards (MMC standards) under SCSI-3 and can be handled at application level. Now, a method for writing the equalizer settings as normal audio data will be described.

Figure 11:
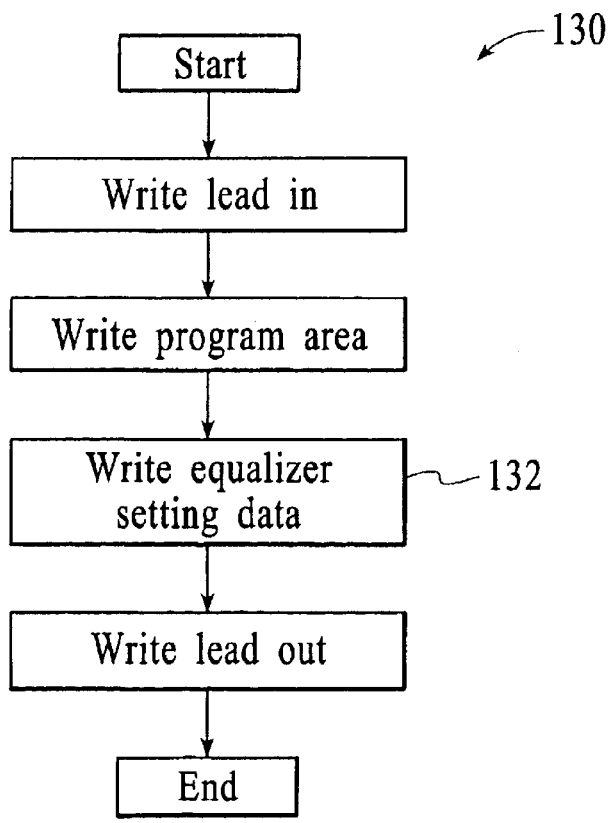
FIG. 11 illustrates a third method for writing the equalizer settings onto the media in accordance with the invention.

FIG. 11 illustrates a third method 130 for writing the equalizer settings onto the media in accordance with the invention wherein, in step 132, the equalizer settings are written as normal data and the other steps are unaffected. In particular, the equalizer settings may be stored as data (for example, twenty (20) bytes of data at the start of each track or twenty (20) bytes at the end of each track. The writing of the equalizer settings as data (20 bytes at the start of each track) is the easiest way to store the EQ information. The additional 20 bytes in the track data will not be noticed when this CD is played because it will equivalent to 0.1133 millisecond. Such CD will be played by the other players and devices but going this way is violating the audio CD format. The advantage of this technique are that it is easy to read and write the EQ information and the driver levels of the CD do not need to be adjusted or modified.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A piece of media having equalizer effects, the media having one or more pieces of data stored thereon, the data further comprising:

a plurality of digital samples of audio data; and one or more equalizer settings so that the audio samples are equalized when the audio data is listened to.

2. The piece of media of claim 1, wherein the plurality of digital samples of audio data further comprise equalizer audio data.

3. The piece of media of claim 1, wherein an external equalizer equalizes the audio data on the piece of media using the stored equalizer settings on the piece of media.

4. The piece of media of claim 1, wherein the equalizer settings are stored in a particular location on the piece of media.

5. The piece of media of claim 4, wherein the particular location further comprises a lead in area on the piece of media.

6. The piece of media of claim 5, wherein the particular location further comprises a CD-TEXT area of the lead in area.

7. The piece of media of claim 5, wherein the particular location further comprises a main channel in the lead in area.

8. The piece of media of claim 5, wherein the particular location further comprises a table of contents in the lead in area.

9. The piece of media of claim 4, wherein the particular location further comprises a program area of the piece of media.

10. The piece of media of claim 4, wherein the particular location further comprises appended to the end of each track of audio data.

11. The piece of media of claim 1, wherein the equalizer settings affect the equalization of all audio data on the piece of media.

12. The piece of media of claim 1, wherein a particular equalizer settings is associated with each track on the piece of media so that each track has its own equalizer settings.

13. The piece of media of claim 12, wherein a particular equalizer settings comprise 20 bytes of data for a 20 band equalizer for each track on the piece of media.

14. The piece of media of claim 13, wherein the piece of media further comprises a compact disk.

15. A method for generating a piece of media having equalizer effects, the method comprising:
storing a plurality of digital samples of audio data onto a piece of media;
storing one or more equalizer settings onto the piece of media so that the audio data is equalized when it is played.

16. The method of claim 15, wherein storing the digital samples further comprises storing equalized audio data on the piece of media that, when executed, produce equalized audio data without an equalizer.

17. The method of claim 15 further comprising utilizing an external equalizer to equalize the audio data on the piece of media using the stored equalizer settings on the piece of media.

18. The method of claim 15, wherein storing the equalizer settings further comprises storing the equalizer settings in a particular location on the piece of media.

19. The method of claim 18, wherein storing in the particular location further comprises storing in a lead in area on the piece of media.

20. The method of claim 19, wherein the particular location further comprises a CD-TEXT area of the lead in area.

21. The method of claim 19, wherein the particular location further comprises a main channel in the lead in area.

22. The method of claim 19, wherein the particular location further comprises a table of contents in the lead in area.

23. The method of claim 18, wherein storing in the particular location further comprises storing in a program area of the piece of media.

24. The method of claim 18, wherein storing in the particular location further comprises appending the equalizer settings to the end of each track of audio data.

25. An apparatus for providing equalized audio data from a piece of media, the apparatus comprising:
a piece of media having a plurality of samples of audio data and one or more equalizer settings stored on the piece of media; and
a player for playing the audio data contained on the piece of media wherein the audio data is equalized.

26. The apparatus of claim 25 wherein the plurality of audio data samples further comprise equalized audio data stored thereon.

27. The apparatus of claim 26, wherein the player further comprises an embedded equalizer.

28. The apparatus of claim 27, wherein the embedded equalizer is off and the equalized audio data from the piece of media is played.

29. The apparatus of claim 27, wherein the embedded equalizer is on and wherein the embedded equalizer nullifies the equalized audio data on the piece of media using the equalizer settings to generate raw audio data and equalizes the raw audio data using its own equalizer settings.

30. The apparatus of claim 25 wherein an external equalizer equalizes the audio data on the piece of media using the stored equalizer settings on the piece of media.

31. The apparatus of claim 25 wherein the piece of media has equalizer settings that are stored in a particular location on the piece of media.

32. The apparatus of claim 31, wherein the particular location on the piece of media further comprises a lead in area on the piece of media.

33. The apparatus of claim 31, wherein the particular location further comprises a CD-TEXT area of the lead in area.

34. The apparatus of claim 31, wherein the particular location further comprises a main channel in the lead in area.

35. The apparatus of claim 31, wherein the particular location further comprises a table of contents in the lead in area.

36. The apparatus of claim 31, wherein the particular location on the piece of media further comprises a program area of the piece of media.

37. The apparatus of claim 31, wherein the particular location on the piece of media further comprises appended to the end of each track of audio data.

38. The apparatus claim 25, wherein the equalizer settings affect the equalization of all audio data on the piece of media.

39. The apparatus of claim 25, wherein a particular equalizer settings is associated with each track on the piece of media so that each track has its own equalizer settings.

40. The apparatus of claim 39, wherein a particular equalizer settings comprise 20 bytes of data for a 20 band equalizer for each track on the piece of media.

41. The apparatus of claim 40, wherein the piece of media further comprises a compact disk.

* * * * *